A. ROOS.
MOLD.
APPLICATION FILED AUG. 25, 1909.

978,938.

Patented Dec. 20, 1910.

Witnesses,

Inventor,
Alphonse Roos,
By
Attorneys.

UNITED STATES PATENT OFFICE.

ALPHONSE ROOS, OF LOS ANGELES, CALIFORNIA.

MOLD.

978,938.  Specification of Letters Patent.  Patented Dec. 20, 1910.

Application filed August 25, 1909. Serial No. 514,536.

*To all whom it may concern:*

Be it known that I, ALPHONSE ROOS, a citizen of the Republic of France, residing at Los Angeles, in the county of Los Angeles and State of California, have invented a new and useful Mold, of which the following is a specification.

This invention relates more particularly to a mold for forming frozen substances, such as ice creams, water ices and custards into novel forms and configurations, and a main object thereof is to form a mold which may be readily inserted into a mass of frozen substances, and which when filled may be instantly ejected therefrom into the serving receptacle.

A further object is to provide a hand mold of a novel construction wherein the operation of the ejecting mechanism is partially controlled by pneumatic means.

I accomplish the above objects by means of the device described herein and illustrated in the accompanying drawings annexed hereto, in which:—

Figure 1:
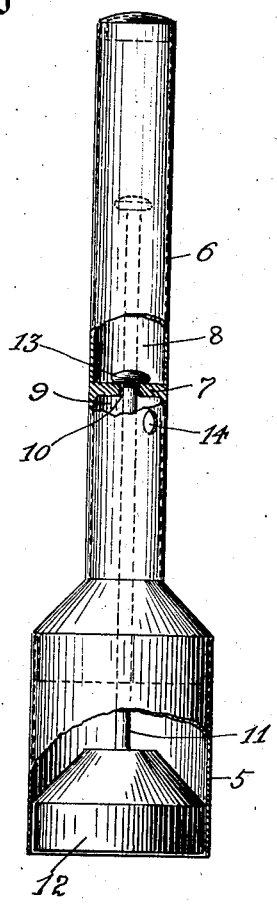
Figure 2:
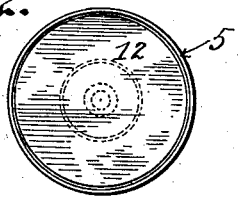

Figure 1— is a side elevation of my improved mold partly broken away for clarity of illustration. Fig. 2— is a bottom plan view of the mold.

Referring more specifically to the drawings, 5 designates a mold receptacle or molding chamber, preferably formed of metal, cylindrical in configuration, and having a hollow handle 6 formed integrally therewith. This handle is sealed at the outer end, and located therein intermediate its length is a bearing partition or head 7, dividing the handle into upper and lower chambers 8, 9. This partition is provided with a centrally disposed aperture 10 through which passes a rod or guide stem 11, to the lower end of which is rigidly secured a cylindrical ejecting block 12, the upper end of the rod that projects into chamber 8 being provided with a stop 13 to limit its downward movement. The wall of chamber 8 is provided with an aperture 14 or air-vent whose function will be more particularly described later on.

When an operator uses my improved hand mold, the mold is first submerged in water, so that the substance which it is to be forced into will not adhere thereto. As the mold receptacle is forced into the frozen substance, such for instance as ice cream, the ejecting block is forced upwardly into the chamber until it reaches the limit of its movement. When the receptacle has been filled, the operator closes the aperture 14, the air confined within the chamber behind the ejecting block exerting a less pressure on the substance contained within the receptacle than the pressure of the atmosphere against the molded substance within the receptacle, thus the substance in the receptacle will be retained therein until the pressure above and below the substance is equalized, this being accomplished by the operator uncovering aperture 14. As soon as the pressure is equalized, the molded substance will fall by gravity, the heavy ejecting block accelerating its downward movement into the serving or receiving receptacle.

It will be apparent from the above description that I have formed a novel hand mold, by means of which various substances may be readily molded into desired forms, and that can be ejected therefrom at the will of the operator. It will also be understood that I may form the molding receptacle into a variety of configurations, as well as the ejector block. It will be seen that the hollow handle 6 and the receptacle 5 communicate and form an air chamber into which the ejector block 12 recedes.

Having described my invention what I claim as new and desire to secure by Letters Patent, is:—

1. In a molding device, in combination, a molding chamber for a plastic substance, an ejecting member mounted loosely in said molding chamber, said device having an air chamber in the rear of said molding chamber, said air chamber having an air vent to the atmosphere adapted to be closed to check the outward movement of said ejecting member.

2. In a molding device, in combination, a molding chamber, a block mounted in said molding chamber and adapted to recede into the interior thereof, an air chamber connecting with said molding chamber in the rear of said block, said air chamber having an air vent adapted to be closed to prevent the admission of air on a forward movement of said block in said molding chamber.

3. In a molding device, in combination, a cylindrical molding chamber, an ejecting block adapted to withdraw into the interior of said molding chamber, a tubular handle connected with said molding chamber and forming an air chamber connecting with the interior of said molding chamber, said tubular handle having a vent therein adapted to be closed to prevent the admission of air at the rear of said block when said block moves forwardly.

4. In a molding device, in combination, a cylindrical molding chamber, an ejecting block adapted to withdraw into the interior of said molding chamber, a tubular handle connected with said molding chamber and forming an air chamber connecting with the interior of said molding chamber, said tubular handle having a vent therein adapted to be closed to prevent the admission of air at the rear of said block when said block moves forwardly, and means to limit the forward movement of said block in said chamber.

5. In a molding device, in combination, a cylindrical molding chamber open at its forward end, a tubular handle forming an air chamber attached to and connecting with the rear side of said molding chamber, said tubular handle having a transverse head therein, a block mounted in said molding chamber and adapted to withdraw into the interior thereof, a stem mounted on said block passing through said head, and means on said stem for engaging the said head to limit the outward movement of said block, said tubular handle having a vent adapted to be closed to prevent admission of air to said air chamber when said block moves forwardly.

In witness that I claim the foregoing I have hereunto subscribed my name this 19th day of August, 1909.

A. ROOS.

Witnesses:
 EDMUND A. STRAUSE,
 MYRTLE A. PALMER.